(12) United States Patent  (10) Patent No.: US 8,984,184 B2
Barr et al.  (45) Date of Patent: Mar. 17, 2015

(54) SYSTEM AND METHOD FOR MANAGING INPUT/OUTPUT DATA OF PERIPHERAL DEVICES

(71) Applicants: Thomas William Barr, Houston, TX (US); Scott Rixner, Spring, TX (US)

(72) Inventors: Thomas William Barr, Houston, TX (US); Scott Rixner, Spring, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 14/245,205

(22) Filed: Apr. 4, 2014

(65) Prior Publication Data

US 2014/0304440 A1  Oct. 9, 2014

Related U.S. Application Data

(60) Provisional application No. 61/808,844, filed on Apr. 5, 2013.

(51) Int. Cl.
*G06F 3/06* (2006.01)
*G06F 13/38* (2006.01)

(52) U.S. Cl.
CPC ............ *G06F 3/0656* (2013.01); *G06F 3/0604* (2013.01); *G06F 3/0683* (2013.01); *G06F 2003/0691* (2013.01)
USPC ............ 710/52; 710/2; 710/5; 710/8; 710/11; 710/38

(58) Field of Classification Search
None
See application file for complete search history.

(56) References Cited

U.S. PATENT DOCUMENTS

2012/0233360 A1* 9/2012 Go et al. ............ 710/23

OTHER PUBLICATIONS

Agha, G., "Actors: A Model of Concurrent Computation in Distributed Systems", MIT Artificial Intelligence Laboratory, 1985 (204 pages).
Anh, et al., "Survey and performance evaluation of real-time operating systems (RTOS) for small microcontrollers", Singapore, IEEE 2009 (14 pages).
Armstrong, Joe, "Erlang—A survey of the language and its industrial applications", Computer Science Laboratory, Sweden, Sep. 18, 1996 (8 pages).
Clinger, William Douglas, "Foundations of Actor Semantics", MIT Artificial Intelligence Laboratory, May 1981 (178 pages).
Haller, P, Odersky, M., "Event-Based Programming without Inversion of Control", EPFL, Switzerland, (20 pages).
Haller, P., Odersky, M., "Actors that Unify Threads and Events", Lamp-Report-2007-001, EPFL, Switzerland, (17 pages).
Hewitt, C. et al., "A Universal Modular ACTOR Formation for Artificial Intelligence", (11 pages).

(Continued)

*Primary Examiner* — Scott Sun
(74) *Attorney, Agent, or Firm* — Osha · Liang LLP (57) ABSTRACT

A method for communicating data between peripheral devices and an embedded processor that includes receiving, at a data buffer unit of the embedded processor, the data from a peripheral device. The method also includes copying data from the data buffer unit into the bridge buffer of the embedded processor as a bridge buffer message. Additionally, the method includes creating, after storing the data as a bridge buffer message, a peripheral device message comprising the bridge buffer message, and sending the peripheral device message to a thread message queue of a subscriber.

22 Claims, 7 Drawing Sheets

(56) References Cited

OTHER PUBLICATIONS

Levis, P., et al., "TinyOS: An Operating System for Sensor Networks", (34 pages).

Lieberman, Henry, "Thinking About Lots of Things at Once Without Getting Confused, Parallellism in Act 1" Massachusetts Institute of Technology Artificial Intelligence Laboratory, May 1981 (24 pages).

* cited by examiner

SYSTEM AND METHOD FOR MANAGING INPUT/OUTPUT DATA OF PERIPHERAL DEVICES

CROSS-REFERENCE TO RELATED APPLICATIONS

Pursuant to 35 U.S.C. §119 (e), this application claims benefit of U.S. Provisional Application No. 61/808,844 filed on Apr. 5, 2013, entitled "BRIDGING ARCHITECTURE FOR EMBEDDED RUNTIME SYSTEMS." The disclosure of the U.S. Provisional Application is incorporated herein by reference in its entirety.

STATEMENT REGARDING FEDERALLY SPONSORED RESEARCH OR DEVELOPMENT

This invention was made with government support under Grant Number CNS -1018840 awarded by the National Science Foundation. The government has certain rights in the Invention.

BACKGROUND

Embedded processors often have peripheral devices attached from which data is either received or to which data is sent. Data received from peripheral devices must be detected, handled, and provided to appropriate software executing on the embedded processor for the embedded processor to perform its intended function(s).

SUMMARY

In general, in one aspect, the invention relates to a method for communicating data between peripheral devices and an embedded processor that includes receiving, at a data buffer unit of the embedded processor, the data from a peripheral device. The method also includes copying data from the data buffer unit into the bridge buffer of the embedded processor as a bridge buffer message, creating, after copying the data as a bridge buffer message, a peripheral device message comprising the bridge buffer message, and sending the peripheral device message to a thread message queue of a subscriber.

In general, in one aspect, the invention relates to an embedded processor connected to a peripheral device. The embedded processor includes a processor, memory, a data buffer unit configured to store data received from the peripheral device, a bridge buffer operatively connected to the data buffer unit and to a thread message queue, and a subscriber executing on the embedded processor. The subscriber is attached to the thread message queue. The embedded processor includes functionality to receive, at the data buffer unit of the embedded processor, data from the peripheral device, and to copy data from the data buffer unit into the bridge buffer of the embedded processor as a bridge buffer message. The embedded processor also includes functionality to create, after copying the data as a bridge buffer message, a peripheral device message comprising the bridge buffer message and to send the peripheral device message to a thread message queue of a subscriber.

In general, in one aspect, the invention relates to a non-transitory computer readable medium that includes instructions, which, when executed by a processor, perform a method for communicating data between peripheral devices and an embedded processor. The method includes receiving, at a data buffer unit of the embedded processor, the data from a peripheral device. The method also includes copying data from the data buffer unit into the bridge buffer of the embedded processor as a bridge buffer message. Additionally, the method includes creating, after copying the data as a bridge buffer message, a peripheral device message comprising the bridge buffer message and sending the peripheral device message to a thread message queue of a subscriber.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to the handling of data exchanged between an embedded processor and peripheral devices attached to the embedded processor. More specifically, one or more embodiments of the invention include functionality to store data in a bridge buffer that is either received from or to be sent to a peripheral device. Data received from a peripheral device may, after being stored in the bridge buffer, be placed in a thread message queue for later consumption by a software thread.

Figure 1:
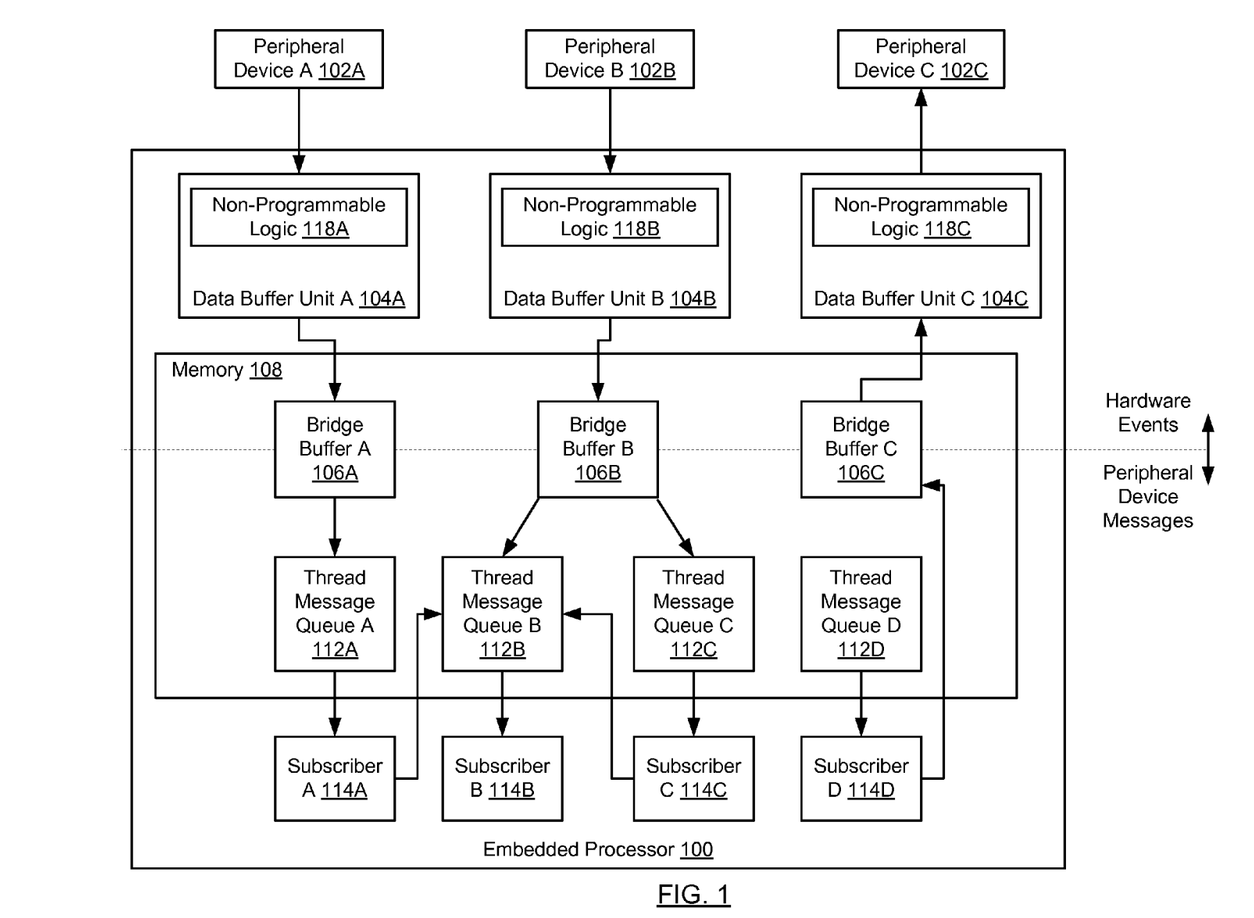
FIG. 1 shows a system in accordance with one or more embodiments of the invention.

FIG. 1 shows a system in accordance with one or more embodiments of the invention. In one or more embodiments of the invention, the system includes an embedded processor (100) and peripheral devices (102A-102C). The embedded processor (100) may include data buffer units (104A-104C), bridge buffers (106A-106C), memory (108), subscribers (114A-114D) and thread message queues (112A-112D). Each of these components is described below.

In one or more embodiments of the invention, the peripheral devices (102A-102C) are devices connected to the embedded processor (100). A peripheral device (102A-102C) is a device that may provide data to, receive data from, or store/manipulate data for the embedded processor (100). A peripheral device (102A-102C) may exist outside the embedded processor (100) (e.g., an external button) or may be included in an integrated package that includes the embedded processor (100) (e.g., an onboard timer).

The peripheral devices (102A-102C) may be connected to the embedded processor via a universal asynchronous receiver/transmitter (UART), a universal serial bus (USB) connection, a general purpose input/output (GPIO) connection, a serial port, a serial peripheral interface (SPI) bus, an inter-integrated circuit ($I^2C$), a controller area network (CAN) interface, a FlexRay interface, a low pin count (LPC) interface, or any other interface of the embedded processor.

In one or more embodiments of the invention, peripheral devices (102A-102C) include functionality to detect and report to the embedded processor (100) various data related to the physical environment in which the embedded processor exists. For example, location, distance/area/volume, time, pressure, temperature, orientation, light, sound, user input, and/or visual data may be detected and reported by the peripheral devices. Peripheral devices (102A-102C) may include functionality to perform actions/instructions received from the embedded processor. For example, the peripheral devices may include functionality to output images and/or sounds received from the embedded processor (100). Peripheral devices (102A-102C) may also include functionality to read/scan codes and/or convert data from one form to another before transmission to the embedded processor (100). Examples of peripheral devices (102A-102C) include, but are not limited to: a button, a keyboard, a touchscreen display device, a mouse, a switch, a global positioning system (GPS), a range finder, light emitting diodes, a relay, a display, a keypad, a converter, a solenoid, a piezoelectric device, a thermometer, a radio device, a barometer, a humidity sensor, a light sensor, a gyroscope, a video/image capturing and/or displaying device, a sound capturing and/or emitting device, a motor, a shaft encoder, a servo, an electronic engine control unit, an ignition controller, and a timer. A peripheral device may be another embedded processor, a computing device (e.g., a desktop computer, a cellular phone, a server), or any device that includes functionality to communicate with (e.g., receive data from and/or transmit data to) the embedded processor.

In one or more embodiments of the invention, the embedded processor (100) is a computing device. As used in this document, the term "computing device" refers to a system capable of electronically processing instructions. In one or more embodiments of the invention, the embedded processor (100) is any type of computing device that includes at least the minimum processing power, memory, and input and/or output interfaces/device(s) to perform one or more embodiments of the invention. The embedded processor may include one or more computer processor(s) (non shown), associated memory (108) (e.g., random access memory (RAM), cache memory, flash memory, etc.), one or more storage device(s) (not shown) (e.g., a hard disk, a flash memory storage, etc.), and numerous other elements and functionalities. The various elements of the embedded processor may be co-located in the same integrated package. Alternately, one or more of the elements (e.g., memory) may be external and operatively connected to the embedded processor. The computer processor(s) of the embedded processor (100) may be an integrated circuit for processing instructions. For example, the computer processor(s) of the embedded processor (100) may be one or more cores, or micro-cores of a processor. Instructions may be processed by the one or more processors included in embedded processor (100). Instructions may include software instructions related to handling data received from or destined for peripheral devices (e.g., 102A-102C). Software instructions in the form of computer readable program code to perform embodiments of the invention may be stored, in whole or in part, temporarily or permanently, on a non-transitory computer readable medium such as a storage device, flash memory, physical memory, or any other computer readable storage medium. Specifically, the software instructions may correspond to computer readable program code that, when executed by a processor(s), is configured to perform embodiments of the invention.

While the term embedded processor is used herein to describe the computing device of the invention, one skilled in the art and having the benefit of this disclosure will recognize that the present invention may be implemented on a desktop computer, a server, a handheld computing device, an application processor, or any device that includes a central processing unit, a graphics processing unit, or a digital signal processor, or any other device that includes functionality to execute any form of software or firmware.

In one or more embodiments of the invention, the embedded processor (100) to which the peripheral devices (102A-102C) are attached is a computing device designed for use in embedded systems. An embedded system is a computing device with a dedicated function that is embedded within a larger system. In other embodiments of the invention, the embedded processor (100) is a self-contained system. In one or more embodiments of the invention, the embedded processor includes functionality to execute a virtual machine (VM) (not shown).

In one or more embodiments of the invention, the embedded processor (100) includes data buffer units (104A-104C). The data buffer units may be operatively connected to the peripheral devices (102A-102C) and to the bridge buffers (106A-106C). A buffer is physical memory used to temporarily store data. In one or more embodiments of the invention, memory (e.g., random access memory (RAM), cache memory, flash memory, etc.) for the data buffer units (104A-104C) is separate, physically or logically, from other embedded processor memory (108) and is dedicated to the peripheral devices. In other embodiments of the invention, the memory for the data buffer units (104A-104C) is a portion of the embedded processor memory (108) that is assigned for receiving data from and/or sending data to the peripheral devices (102A-102C). In one or more embodiments of the invention, the data buffer units (104A-104C) are first-in, first-out (FIFO) buffers, in which the first data received is the first data to be processed by the embedded processor (100) with subsequently received data being processed in the order it is received. In one or more embodiments of the invention, the data buffer units may have a memory size of zero. In such embodiments of the invention, the data buffer unit is used, for example, to indicate a hardware event, such as a button press, has occurred.

In one or more embodiments of the invention, the data buffer units include non-programmable logic (118A-118C). The non-programmable logic may be logic that defines what happens when data arrives at a data buffer unit either from, or destined for, a peripheral device. For example, the non-programmable logic may be implemented as a circuit that is designed to raise an interrupt when a peripheral device sends data for the embedded processor. An interrupt may be a signal indicating that an event (e.g., a hardware event) has occurred. The interrupt may then be trapped by an interrupt controller that alerts the embedded processor, which may then invoke an interrupt service routine (ISR). In one or more embodiments of the invention, non-programmable logic can not be dynamically programmed (i.e., changed) to respond differently to inputs. In one or more embodiments of the invention, the non-programmable logic may be instructions, stored in read-only memory, for performing one or more actions in response to an input. Interrupts and ISRs are discussed further in the description of FIG. 5 below.

In one or more embodiments of the invention, there is a data buffer unit (104A-104C) for each attached peripheral device (102A-102C). In other embodiments of the invention, one or more peripheral devices may share a data buffer unit (104A-104C). In still other embodiments of the invention, there are two or more data buffer units for each attached peripheral device, with one or data buffer units for a given peripheral device configured to receive data from the peripheral device and one or more data buffer units configured to send data to the peripheral device.

In one or more embodiments of the invention, data buffer units (104A-104C) include functionality to receive data from the peripheral devices (102A-102C) and store it temporarily before the embedded processor (100) processes the received data. The amount of data received from the peripheral devices (102A-102C) may exceed the size of the data buffer units (104A-104C). In such embodiments of the invention, the embedded processor may be configured to process data from the data buffer unit each time it is full in order to receive all data from a peripheral device.

In one or more embodiments of the invention, the bridge buffers (106A-106C) are operatively connected to the data buffer units (104A-104C) and include functionality to temporarily store the received data from or destined for the peripheral devices. In one or more embodiments of the invention, there is a single bridge buffer for each peripheral device (102A-102C) that is either configured to store data from peripheral devices or to store data destined for a peripheral device. In other embodiments of the invention, there are at least two bridge buffers per peripheral device, with one bridge buffer configured to temporarily store data received from peripheral devices and one bridge buffer configured to temporarily store data that is to be sent to the peripheral devices. In one or more embodiments of the invention, the bridge buffers (106A-106C) include functionality to facilitate communication between peripheral devices (102A-102C) and subscribers (e.g., subscriber A (114)). The bridge buffers may be ring (i.e., circular) buffers, or any other type of buffer that includes, at a minimum, functionality to store data in accordance with one or more embodiments of the invention. Ring buffers are described in more detail in the discussion of FIG. 2 below.

In one or more embodiments of the invention, the embedded processor (100) includes functionality to copy data to a bridge buffer (106A-106C) from a data buffer unit (104A-104C) as it is received from the peripheral devices (102A-102C), and/or to copy data destined for a peripheral device from a bridge buffer to a data buffer unit. In one or more embodiments of the invention, data from a peripheral device, received at a data buffer unit, and copied to a bridge buffer is data that indicates a hardware event. Similarly, data in a bridge buffer from a subscriber that is copied to a peripheral device via a data buffer unit may be data intended to cause a hardware event. Thus, data between the peripheral devices (102A-102C) and the bridge buffers (106A-106C) in FIG. 1 may be considered representative of hardware events. On the other side of the bridge buffers, between the bridge buffers and thread message queues, the data from a peripheral device may be converted into a peripheral device message intended to be stored in a thread message queue of a software thread.

In one or more embodiments of the invention, bridge buffers (106A-106C) include functionality to store record of one or more subscribers that have subscribed to receive data from or to send data to a peripheral device associated with a bridge buffer. In one or more embodiments of the invention, the record of subscribers to the peripheral device of a given bridge provides an embedded processor with the necessary information to direct data from the peripheral devices and stored in the bridge buffers to the appropriate subscribers, and/or to direct data from a subscriber and stored in a bridge buffer to the appropriate peripheral device via a data buffer unit (104A-104C).

In one or more embodiments of the invention, one or more subscribers (e.g., 114A-114D) are executing on the embedded processor. The subscribers (114A-114D) may be software threads created in order to perform instructions of programs and/or applications executing on the embedded processor. In one or more embodiments of the invention, the subscribers (114A-114D) include functionality to process the received data from peripheral devices (102A-102C). The subscribers (114A-114D) may be configured such that they "subscribe" to be informed of, send data to, and/or receive data from one or more peripheral devices (102A-102C) using, at least in part, a bridge buffer.

In one or more embodiments of the invention, the embedded processor includes a thread message queue (112A-112D) for each subscriber (114A-114D). In one or more embodiments of the invention, the thread message queues (112A-112D) are implemented in memory (108) and are persistent for the life of the subscribers (114A-114D). The thread message queues (112A-112D) may be designed to store software messages that are sent from other subscribers. For example, in the particular embodiment shown in FIG. 1, subscriber A (114A) and subscriber C (114C) include functionality to place software messages in thread message queue B (112B) or subscriber B (114B). In one or more embodiments of the invention, the thread message queues (112A-112D) include functionality to receive and store peripheral device messages (e.g., messages which include the received data from the peripheral devices (102A-102C)).

In one or more embodiments of the invention, bridge buffers (e.g., 106A-106C) are associated with one or more thread message queues (112A-112D). In embodiments of the invention in which a bridge buffer is used to communicate data from a subscriber to a peripheral device, the bridge buffer may be associated with a subscriber rather than the thread message queue of the subscriber. For example, in the particular embodiment pictured in FIG. 1, bridge buffer A (106A), is associated with thread message queue A (112A), bridge buffer B (106B) is associated with thread message queue B (112B) and thread message queue C (112C), and bridge buffer C (106C), is associated with subscriber D (114D) and is configured to store data to be communicated from subscriber D (114D) to peripheral device C via data buffer unit C (104C). Additionally, although not shown in FIG. 1, thread message queues (e.g., 112A-112D) may be associated with one or more bridge buffers (e.g., 106A-106D). In one or more embodiments of the invention, a thread message queue (e.g., 112C) is associated with each bridge buffer (106A-106C) attached to a peripheral device (102A-102C) to which the subscriber (114A-114C) has subscribed.

In one or more embodiments of the invention, the bridge buffers (106A-106C), the thread message queues (112A-112D), and the subscribers (114A-114D) execute in a VM (not shown) that is executing on the embedded processor (100). A VM is a software implementation of a computing device. A VM may abstract the underlying operating system and/or hardware of the computing device (e.g., embedded processor (100)) from the instructions that execute within it. In one or more embodiments of the invention, the VM includes functionality to execute instructions. A VM includes functionality to allow execution of a single version of a software program on a variety of operating systems (not shown) and/or hardware systems (not shown).

In one or more embodiments of the invention, the bridge buffers (106A-106C), the thread message queues (112A-112D), and the subscribers (114A-114D) execute directly on the embedded processor (100), on a real-time operating system executing on the embedded processor, or on a traditional multitasking operating system executing on the embedded processor rather than in a VM.

Although FIG. 1 shows three peripheral devices, three data buffer units, three bridge buffers, and four subscribers with four thread message queues, in one or more embodiments of the invention, the quantity of each of these components may vary based on the particular requirements for a given implementation of the embedded processor. For example, there may be a greater or fewer number of peripheral devices based on the types of information the embedded processor is required to gather to perform its intended functionality. Additionally, the peripheral devices may share data buffer units and/or bridge buffers, may have more than one data buffer unit and/or bridge buffer, or any combination thereof. For example, a peripheral device may have two bridge buffers, with one configured to store data received from the peripheral device and the other configured to store data that is to be sent to the peripheral device. Also, the number of subscribers and corresponding thread message queues may depend on the requirements of the programs/applications executing on the embedded processor. Furthermore, in embodiments of the invention in which VMs execute on the embedded processor, there may be more than one VM executing on the embedded processor, each with its own subscribers and thread message queues. Additionally, the number of VMs executing on the embedded processor may change during runtime.

The invention is not limited to the system configuration shown in FIG. 1.

Figure 2:
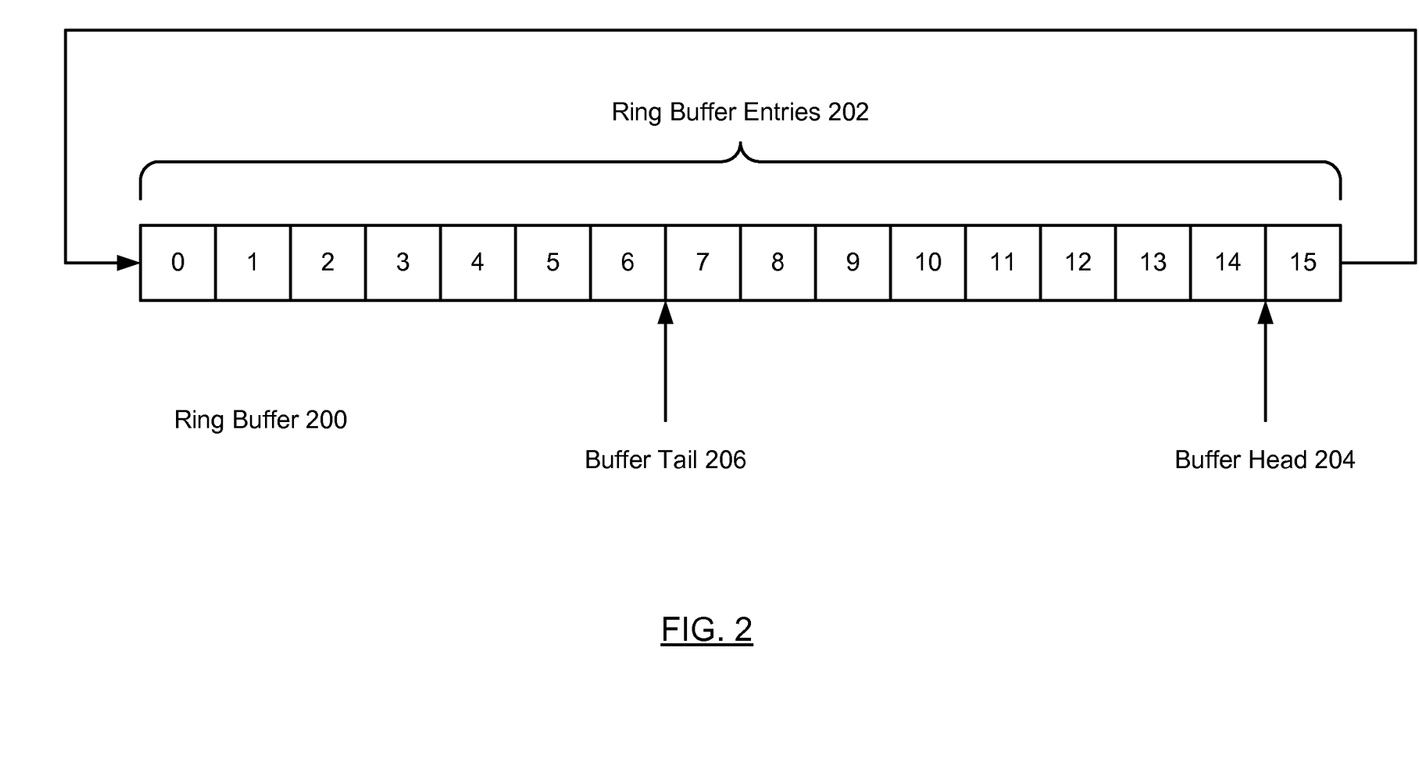
FIG. 2 shows a ring buffer in accordance with one or more embodiments of the invention.

FIG. 2 shows a ring buffer in accordance with one or more embodiments of the invention. In one or more embodiments of the invention, the ring buffer (200) includes ring buffer entries (202), a buffer head pointer (204), and a buffer tail pointer (206). Each of these components is described below.

In one or more embodiments of the invention, the bridge buffers (106A-106C) of FIG. 1 are ring buffers. A ring buffer (200) is a set of ring buffer entries (202) (e.g., memory locations) allocated for use as a buffer, and in which data is placed into the ring buffer entries (202) in a specific order. In one or more embodiments of the invention, each ring buffer entries is single byte. In other embodiments of the invention, each ring buffer entry (202) includes any amount of memory allocated to it as defined by the requirements of the embedded processor for processing data received from of destined for the peripheral devices.

In one or more embodiments of the invention, when all of the ring buffer entries (202) allotted to the ring buffer (200) are written to, the ring buffer (200) includes functionality to return to the first ring buffer entry (e.g., "0" of ring buffer entries (202)) of the set ring buffer entries (202) to allow the writing of data in the same specific order of ring buffer entry locations.

In one or more embodiments of the invention, the ring buffer (200) includes at least two indices, a buffer head (204) and a buffer tail (206), which are used to indicate the beginning and the end of a segment of data within the ring buffer, respectively. For example, in the particular embodiment of the invention shown in FIG. 2, the buffer head (204) and the buffer tail (206) may be used to indicate that a segment of data, such as data received from the peripheral devices, is stored in the ring buffer entries (202) between "7" and "14".

In one or more embodiments of the invention, the physical or virtual memory addresses of the buffer head (204) and the buffer tail (206) are used as to communicate to where to acquire the segment of data and in what order. The buffer head (204) and the buffer tail (206) may be as close as two adjacent ring buffer entries (202) in the set of ring buffer entries, or may differ by as many ring buffer entries (202) as the ring buffer (200) includes. The buffer head (204) and the buffer tail (206) may be constrained such that they may not point to the same ring buffer entry or may not pass one another in the specific order of ring buffer entries (202) allocated to the ring buffer (200). In one or more embodiments of the invention, the ring buffer includes a "count" that enumerates the elements in the segment of data stored in the ring buffer. In one or more embodiments of the invention, the ring buffer (200) includes functionality to store data received from the peripheral devices (102A-102C) of FIG. 1. In other embodiments, the ring buffer (i.e., bridge buffer) is designed such that it doesn't store any data. In such embodiments, the ring buffer only holds the position of the head and tail and is used to specify a number of events (e.g., button presses) that have occurred.

In one or more embodiments of the invention, the ring buffer (200) includes functionality to store the data received from peripheral devices as a bridge buffer message. Messages are discussed in more detail in the description of FIG. 3, below.

Although FIG. 2 shows a ring buffer with sixteen ring buffer entries, one of ordinary skill in the art and having the benefit of this specification will appreciate that the ring buffer may include more or less ring buffer entries, as required by the functions that the embedded processor is to perform related to the receipt of data from or sending data to a peripheral device.

The invention is not limited to the ring buffer configuration shown in FIG. 2.

Figure 3:
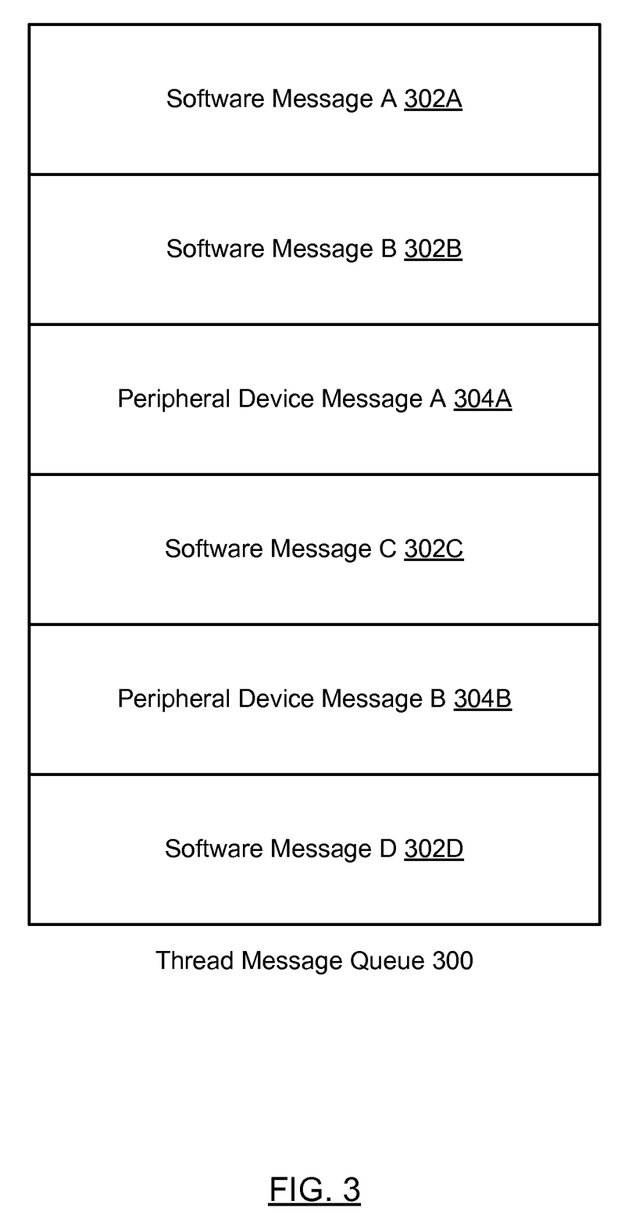
FIG. 3 shows a thread message queue in accordance with one or more embodiments of the invention.

FIG. 3 shows a thread message queue in accordance with one or more embodiments of the invention. In one or more embodiments of the invention, the thread message queue (300) includes software messages (302A-302D) and peripheral device messages (304A-304B). Each of these components is described below.

In one or more embodiments of the invention, each subscriber (e.g., subscribers 114A-114D of FIG. 1) executing in a VM (e.g., VM (110) of FIG. 1) is configured to have a thread message queue (300). The thread message queue (300) is a construct of memory allocated to a subscriber for storing messages from other software threads (e.g., software messages 302A-302D) as well as messages from peripheral devices (e.g., peripheral device messages 304A-304B). In one or more embodiments of the invention, the thread message queue includes only peripheral device messages.

In one or more embodiments of the invention, a software message (302A-302D) is a message from another software thread that provides information to and/or requests action from the subscriber for which the thread message queue (300) exists.

In one or more embodiments of the invention, the peripheral device messages (304A-304B) stored in the thread message queue (300) are data objects that include a bridge buffer message (i.e., data received from the peripheral devices) along with, in some embodiments of the invention, an optional identifier/tag (not shown). A peripheral device message may be any data construct capable of recording data received from a peripheral device (i.e., a bridge buffer message) and conveying the recorded data to one or more thread message queues of one or more appropriate subscribers (e.g., subscribers that are subscribed to receive data from the peripheral device). In one or more embodiments of the invention, the peripheral device message includes an identifier, which may be assigned to the bridge buffer when it is initially created for a peripheral device or any time thereafter. In one or more embodiments of the invention, the identifier/tag associates the data object that includes received data from the peripheral devices (i.e., the bridge buffer message) with the peripheral device from which the data is received, allowing a subscriber to identify the peripheral device from which the message arrived. In one or more embodiments of the invention, the peripheral device messages (304A-304B) stored in the thread message queue (300) are structured as a data object (e.g., a tuple). A tuple is an ordered list of elements. For example, one of the elements of the tuple may be the identifier of the peripheral device message (304A-304B), and another element of the tuple may be the bridge buffer message.

In one or more embodiments of the invention, a peripheral device message (304A-304B) is an immutable data object. Immutable objects are objects that may not be modified after creation.

In one or more embodiments of the invention, the subscriber (e.g., subscribers (114A-114D) of FIG. 1) for which the thread message queue (300) exists includes functionality to process the software messages (302A-302D) and the peripheral device messages (304A-304B) in any order and at any time, based on the requirements of the program/application for which the subscriber is executing. For example, a peripheral device message placed into a thread message queue of a subscriber may be used by the subscriber at any time after it arrives, rather than being used immediately by the subscriber, which may allow the embedded processor to perform other tasks before the data received from a peripheral device is used.

The invention is not limited to the thread message queue configuration shown in FIG. 3.

Figure 4:
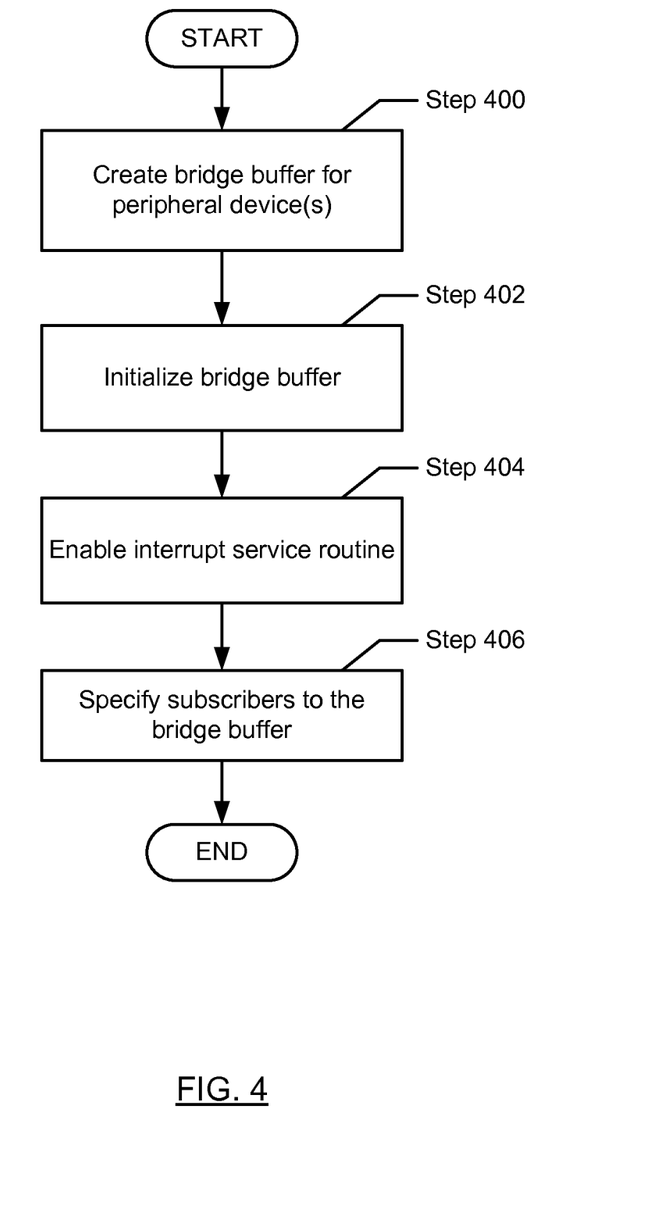
FIG. 4 shows a flowchart in accordance with one or more embodiments of the invention.
Figure 5:
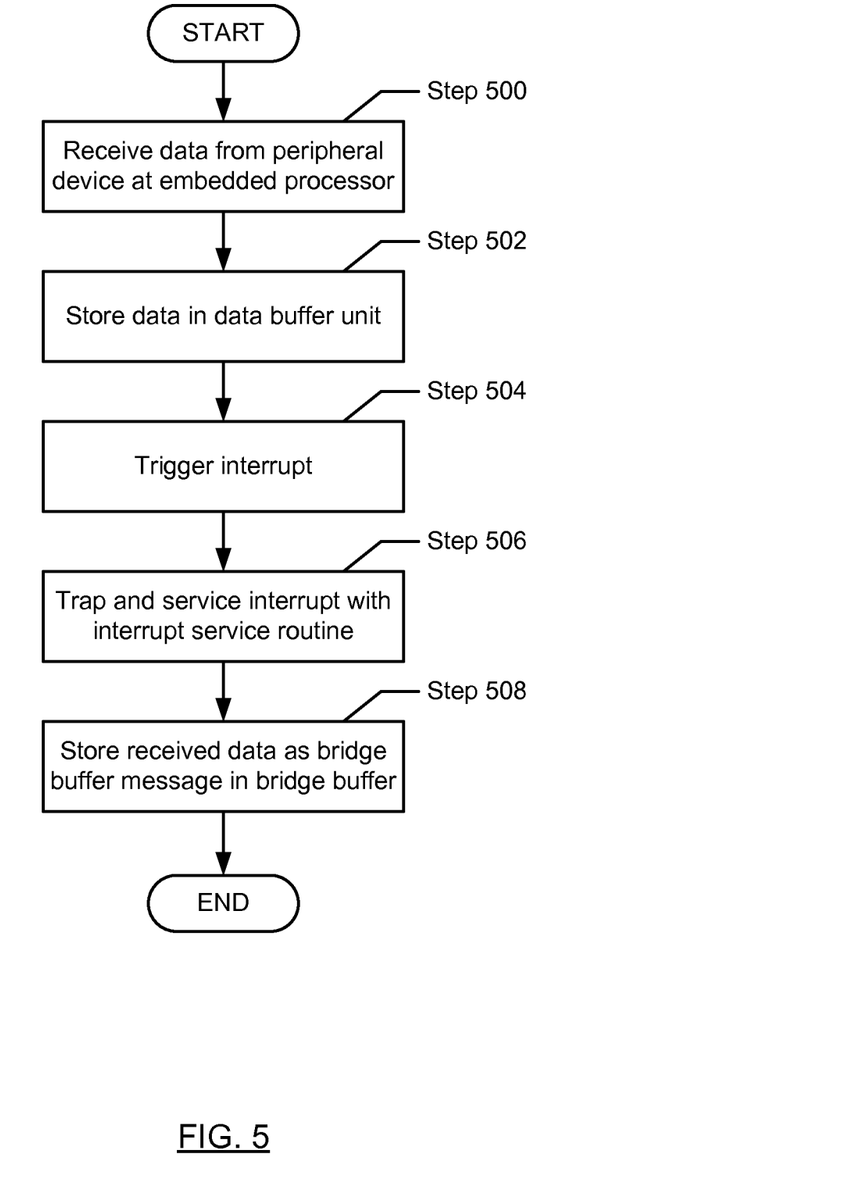
FIG. 5 shows a flowchart in accordance with one or more embodiments of the invention.
Figure 6:
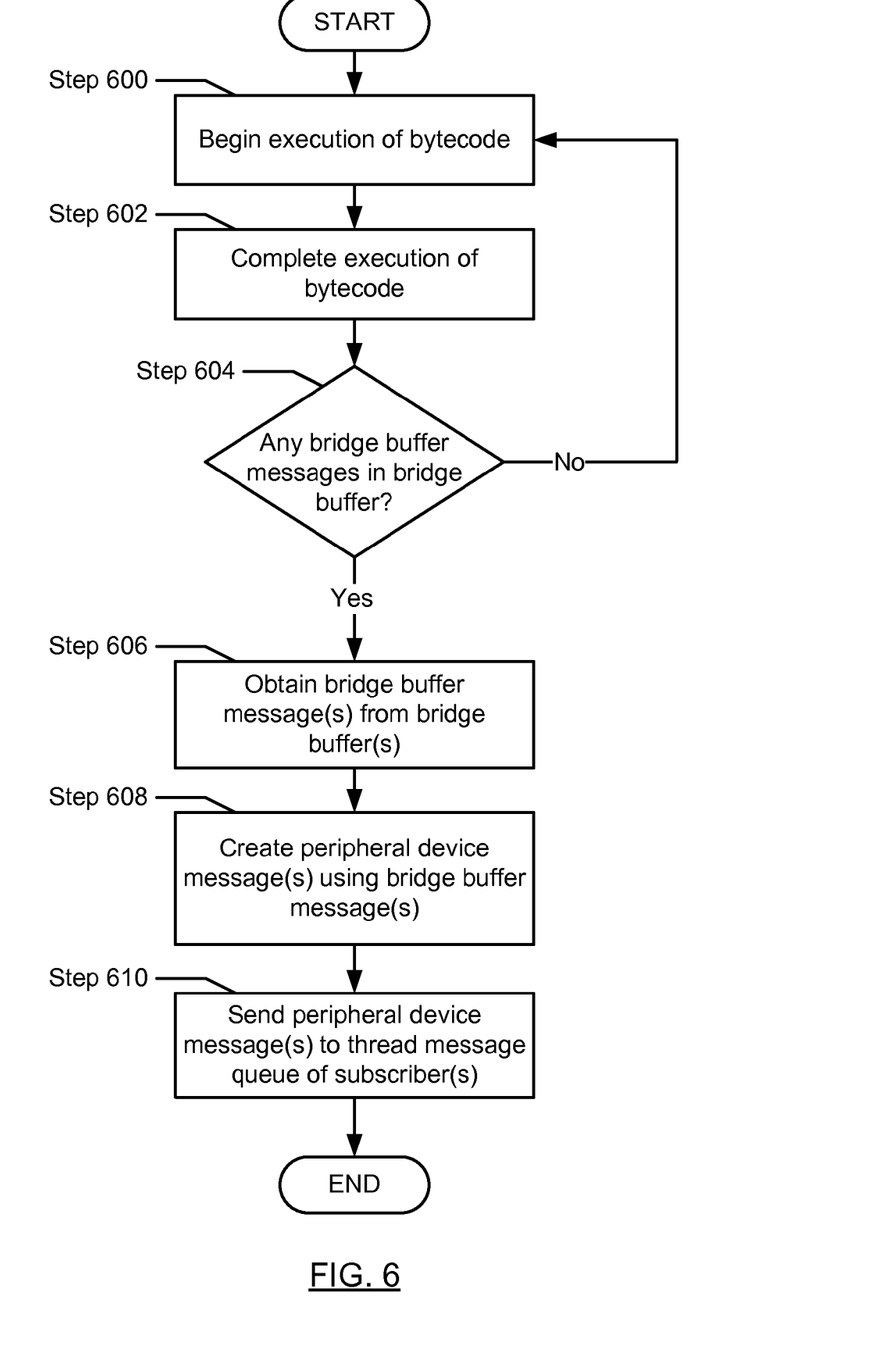
FIG. 6 shows a flowchart in accordance with one or more embodiments of the invention.

FIGS. 4, 5, and 6 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one or more embodiments of the invention, the steps shown in FIGS. 4, 5, and 6 may be performed in parallel with any other steps shown in FIGS. 4, 5, and 6 without departing from the invention.

Turning to FIG. 4, FIG. 4 shows a flowchart that describes a method for preparing an embedded processor to perform functionality on accordance with one or more embodiments of the invention.

In Step 400, a bridge buffer is created for a peripheral device. In one or more embodiments of the invention, one bridge buffer is created for each peripheral device attached to the embedded processor, which may be configured, in part, to either facilitate communicating data from a peripheral device to the thread message queue of a subscriber or facilitate communication of data from a subscriber to a peripheral device. In other embodiments of the invention, two or more bridge buffers are created for each peripheral device attached to the embedded processor with a portion of the bridge buffers configured to receive data from a data buffer unit to which a peripheral device is attached, and the remainder of the bridge buffers configured to copy data to a data buffer unit attached to a peripheral device. A bridge buffer may be any size within the constraints of the embedded processor system. In one or more embodiments of the invention, the size of the bridge buffer is based on the requirements of the peripheral device for which it is created, as well as the requirements of the subscriber that consumes and/or generates the data.

In Step 402, the bridge buffers are initialized. In one or more embodiments of the invention, initializing a bridge buffer includes specifying how much memory the data received from or destined for the peripheral devices includes, and/or specifying how many bridge buffer messages the bridge buffer holds. A bridge buffer may include functionality to store one or more bridge buffer messages at one time. In one or more embodiments of the invention, initialization of the bridge buffers optionally includes specifying an identifier/tag to associate with the bridge.

In Step 404, an interrupt service routine (i.e., an interrupt handler) is enabled. In one or more embodiments of the invention, an interrupt service routine is a sequence of computer instructions whose execution is triggered by a processor after an interrupt is received. Enablement of the interrupt service routine may include configuring the interrupt service routine to be able to handle data received from or destined for the peripheral devices to satisfy the requirements of the intended functionality of the embedded processor system. For example, the ISR may be configured to handle received data from one peripheral device by placing the received data as a bridge buffer message in a bridge buffer created for the device. For another example, the ISR may be configured to copy data from a subscriber that is stored in a bridge buffer to a data buffer unit attached to a peripheral device that is to receive the data from the subscriber. In one or more embodiments of the invention, the ISR is enabled by a program/application executing on the embedded processor.

In Step 406, subscribers to the bridge buffer are specified. In one or more embodiments of the invention, subscribers executing on the embedded processor require access to the data from one or more of the peripheral devices attached to the embedded processor. Specification of subscribers may include determining which subscribers require and/or want access to data from a given peripheral device, or that require sending data to a given peripheral device, and configuring the embedded processor (and/or VM and/or operating system executing on the embedded processor) to be aware of the determination. In one or more embodiments of the invention, specifying subscribers to a particular bridge buffer includes storing with the bridge buffer a record of the one or more subscribers that are to receive data from or send data to a peripheral device. In one or more embodiments of the invention, the record of subscribers stored with a given bridge buffer allows the embedded processor to identify subscribers that are to receive data from the peripheral device associated with the bridge buffer.

Turning to FIG. 5, FIG. 5 shows a flowchart that describes a method for receiving at a embedded processor data from peripheral devices in accordance with one or more embodiments of the invention.

In Step 500, data is received at the embedded processor from a peripheral device. In one or more embodiments of the invention, the data is generated by the peripheral device and delivered to an interface of the embedded processor via electronic signal. The data may arrive continuously, may arrive periodically, or may arrive aperiodically. For example, a program executing in a VM of the embedded processor may require GPS input to determine the location of the embedded processor relative to a map, and therefore the embedded processor is connected to a peripheral GPS device generates the requested coordinates and sends them to the embedded processor periodically. In one or more embodiments of the invention, the data is generated by the peripheral device and received by the embedded processor when an external condition is encountered, such as a certain ambient temperature being detected by an attached thermometer, a range finder determining that a certain threshold distance from an object has been reached, or a button being pressed. In one or more embodiments of the invention, the data is generated by the peripheral device and received by the embedded processor in response to a request generated by the embedded processor. In one or more embodiments of the invention, the data generated by the peripheral device is received by the embedded processor as a modification of an signal such that when the signal changes (e.g., from "low" to "high"), the embedded processor knows that a hardware event has occurred.

In Step 502, the received data (or portions thereof) from the peripheral device are stored in the data buffer unit. In one or more embodiments of the invention, the data buffer unit is small relative to the size of the incoming data. In one or more embodiments of the invention, storing the data in the data buffer unit includes taking the input signal (i.e., data) from the peripheral device and saving it in a specific hardware register allocated for use as the data buffer unit. The data may be of any size required by one or more embodiments of the invention. For example, data from a GPS device may be thirty-two bytes. As another example, the data from a button may be zero bytes, as in the case where the arrival of data merely modifies a signal.

In Step 504, an interrupt is triggered by the non-programmable logic of the data buffer unit to notify the embedded processor that data has been received from the peripheral device. In one or more embodiments of the invention, the detection that the state of the data buffer unit has changed triggers the interrupt, which informs the processor that data has arrived and needs to be processed. In one or more embodiments of the invention, the interrupt is triggered when the data buffer unit is full. In one or more embodiments of the invention, the interrupt includes information that informs the processor of the embedded processor that the interrupt was triggered as a result of receiving data from a peripheral device.

In Step 506, the interrupt is trapped by an interrupt controller, which then causes the embedded processor to invoke and execute an interrupt service routine (ISR). In one or more embodiments of the invention, the ISR is invoked by the embedded processor in response to receiving the interrupt and after suspending other operations that the processor was executing. The ISR may first clear the interrupt. In one or more embodiments of the invention, the ISR uses the data received from the peripheral devices to construct a bridge buffer message. The ISR may need to remove data from the data buffer unit one or more times to acquire all the data required to construct a complete bridge buffer message of the data sent by the peripheral device.

In Step 508, the received data from the peripheral devices is stored in the bridge buffer as a bridge buffer message. In one or more embodiments of the invention, the bridge buffer holds a single bridge buffer message at a time. In other embodiments of the invention, the bridge buffer is allocated enough memory to store more than one bridge buffer message at a time. In other embodiments of the invention, the bridge buffer is designed such that it doesn't store any data. In such embodiments, the bridge buffer only holds the position of the buffer head and buffer tail and is used to specify a number of events that have occurred, and each event (i.e., each increment of one of the bridge buffer indices) constitutes a bridge buffer message. In one or more embodiments of the invention, storing the received data from the peripheral device includes copying the data into the memory locations allocated as a ring buffer to implement the bridge buffer. In one or more embodiments of the invention, the ISR completes servicing the interrupt when the received data is stored in the bridge buffer. In one or more embodiments of the invention, the embedded processor returns to the program/application that it was executing at the time the interrupt was triggered after the ISR completes servicing the interrupt.

While the above description of FIG. 5 assumes that the process of copying data from peripheral devices to the bridge buffers uses programmed reads and writes, one skilled in the art and having the benefit of this disclosure will recognize that other methods of moving data may be used. For example, the data may be copied using direct memory access (DMA) functionality. Additionally, while the above description of FIG. 5 describes the process of receiving data at an embedded processor from a peripheral device, one or more embodiments of the invention include functionality to send data from subscribers to peripheral devices. In such embodiments of the invention, subscribers include functionality to generate data which is copied to a bridge buffer, stored as a bridge buffer message, copied to a data buffer unit, and then sent to the appropriate peripheral device to which the sending subscriber has subscribed.

Turning to FIG. 6, FIG. 6 shows a flowchart that describes a method for storing peripheral device messages in a thread message queue in accordance with one or more embodiments of the invention.

In Step 600, an embedded processor begins execution of a portion of a program such as a bytecode or an AST node. The portion of the program may be executed in a VM or an operating system executing on the embedded processor. In one or more embodiments of the invention, the embedded processor operates as an interpreter that executes intermediate representations of programs/applications. The intermediate representation may be in bytecode, and the embedded processor may execute the program/application one bytecode at a time. In one or more embodiments of the invention, the intermediate representation is an abstract syntax tree (AST), and the embedded processor executes the program/application one node at a time. In one or more embodiments of the invention, the embedded processor includes a just-in-time (JIT) compiler, which compiles the intermediate representation (e.g., bytecode or AST node) into machine code during runtime.

In Step 602, the embedded processor completes execution of a bytecode. In an alternate embodiment of the invention, the embedded processor completes an AST node or completes execution of machine code compiled from a bytecode or an AST node. In Step 604, the embedded processor checks for any bridge buffer messages in the bridge buffer(s). In one or more embodiments of the invention, bridge buffer messages are in a bridge buffer only when data has been received from a peripheral device for which the bridge buffer was created. In one or more embodiments of the invention, if the embedded processor determines that there are no bridge buffer messages in the bridge buffers, the process returns to Step 600, and the embedded processor begins execution of the next portion of the program (e.g., bytecode, AST node, etc.). In one or more embodiments of the invention, if the embedded processor determines that there are one or more bridge buffer messages in a bridge buffer, the process proceeds to Step 606.

Continuing with Step 606, in Step 606, the embedded processor obtains one or more bridge buffer messages from the one or more bridge buffers. A single bridge buffer may include one or more bridge buffer messages. In one or more embodiments of the invention, the embedded processor obtains a single bridge buffer message from a bridge buffer. In other embodiments of the invention, the embedded processor obtains as many bridge buffer messages as are stored in the bridge buffers.

In Step 608, a peripheral device message is created using a bridge buffer message. In one or more embodiments of the invention, a record of the subscribers subscribed to receive information from a peripheral device is stored with the bridge buffer and allows the embedded processor to determine which subscribers should receive the bridge buffer message. In such embodiments, the peripheral device message will include, at least, the contents of the bridge buffer message (i.e., data received from a peripheral device). In one or more embodiments of the invention, the contents of the bridge buffer message merely include information indicating that a bridge buffer indice (e.g., buffer head and/or buffer tail) position has been modified. In one or more embodiments of the invention, the bridge buffer message from the bridge buffer is assigned an identifier/tag, which was optionally specified for the bridge buffer in Step 402 of FIG. 4 and associates the bridge buffer message with the peripheral device from which the bridge buffer message originated, to create a peripheral device message. In one or more embodiments of the invention, the embedded processor uses the bridge buffer message with the data received from the peripheral device along with the identifier/tag to create a peripheral device message as a data construct that includes both (e.g., string, array, tuple, etc.) For example, in one or more embodiments of the invention, in a peripheral device message as a tuple, the identifier/tag is the first element of the tuple, and the bridge buffer message that includes the data received from the peripheral device is the second element of the tuple. In one or more embodiments of the invention, the data construct created by the embedded processor (e.g., a tuple) is an immutable data object.

In Step 610, each peripheral device message (e.g., a tuple) created by the embedded processor in Step 606 and Step 608 is sent to the thread message queue of all subscribers subscribed to receive data from the peripheral device whose data was stored as a bridge buffer message in the bridge buffer. In one or more embodiments of the invention, the record of subscribers stored with the bridge buffer specifies the subscribers that are to receive in their thread message queue the peripheral device message, allowing the embedded processor to understand which subscribers are to receive in their thread message queue a given peripheral device message. In embodiments of the invention that include the optional identifier/tag in the peripheral device message, the identifier/tag portion of the peripheral device message allows a subscriber to identify which peripheral device the message is from after the peripheral message is sent to the thread message queue of the subscriber. In one or more embodiments of the invention, placing the peripheral device message in the thread message queue of the subscriber allows the data from the peripheral device to be used by the subscriber at any time thereafter as necessitated by the requirements of the embodiment of the invention.

Figure 7:
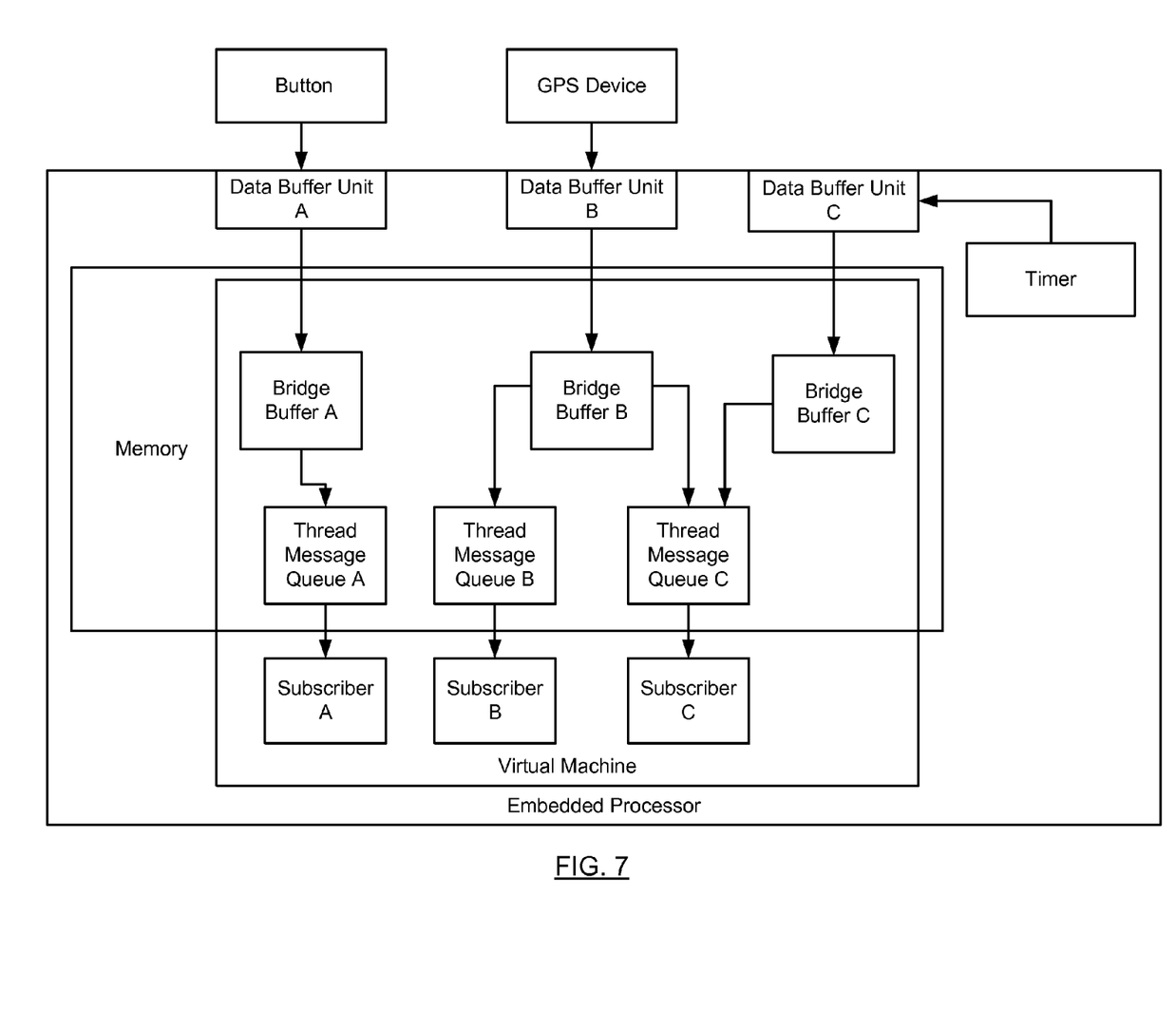
FIG. 7 shows an example in accordance with one or more embodiments of the invention.

FIG. 7 shows an example in accordance with one or more embodiments of the invention. The example is not intended to limit the scope of the invention.

Referring to FIG. 7, consider the scenario in which a embedded processor has three peripheral devices attached to it. One is a button, connected to data buffer unit A via a GPIO port. Another is a global positioning system (GPS) connected to data buffer unit B via a UART serial port. The third attached peripheral device is an onboard timer attached to data buffer unit C. The non-programmable logic of the data buffer units is configured to trigger interrupts when data arrives. Interrupts are trapped by an interrupt controller, which causes the embedded processor to invoke an interrupt service routine (ISR). Each of the three attached peripheral devices has had a bridge buffer configured on the embedded processor to store incoming data. The bridge buffers are each assigned identifier/tags (e.g., A, B, and C). Executing on the embedded processor is a VM that includes at least three executing subscribers, each with a thread message queue configured in which to store messages from other software threads as well as peripheral device messages that include incoming data from peripheral devices. The VM in this example executes programs/applications via execution of bytecode representation of the application/program. The embedded processor in this example also includes onboard memory.

In this example, subscriber A is specified as a subscriber to data received from the button via bridge buffer A. Subscriber B and subscriber C are specified as subscribers to data received from the GPS device via bridge buffer B. Subscriber C is additionally specified as a subscriber to data received from the timer via bridge buffer C.

Turning to the button, in this example when the button is pressed, a signal is sent to the embedded processor. Once a level change is detected in the signal from the button (or data arrives in the data buffer unit), an interrupt is triggered by the non-programmable logic of data buffer unit A that is trapped by an interrupt controller that alerts the embedded processor to temporarily stop executing other instructions (e.g., a bytecode) and invoke the ISR.

Each button press event may be described in five bytes. Four bytes specify the thirty-two bit port number to which the button is connected and the fifth byte represents the status of all eight bits on the port. When the ISR is invoked, it clears the interrupt, then constructs the five-byte bridge buffer message using the incoming data (i.e., that the button was pressed), which is stored in bridge buffer A.

At this point, the ISR completes and the VM returns to executing whatever bytecode it was interpreting/executing before the button was pressed. When the VM completes execution of a bytecode, it checks the bridge buffers for any bridge buffer messages to which the subscribers are subscribed. In the case of the button, subscriber A has been specified as a subscriber to data from the button, and data has been received from the button. Therefore, the VM creates a string out of the bridge buffer message created by the ISR. In one or more embodiments of the invention, subscriber A has been recorded as a subscriber to receive the data in bridge buffer A when it arrives from the button, which allows the VM to know to send the bridge buffer message to thread message queue A of subscriber A. In such embodiments, the VM creates a peripheral device message that includes, at least, the string created from the bridge buffer message and places the peripheral device message in the thread message queue of subscriber A. In one optional embodiment of the invention, the VM uses an identifier/tag of the bridge buffer (i.e., A) to create a two element tuple peripheral device message, where the first element is the identifier/tag A and the second element is the string with the button data. The peripheral device message is then placed in thread message queue A of subscriber A. In the optional embodiment where the VM created a tuple using the string data from the button and the identifier/tag of the bridge buffer, the subscriber may use the identifier/tag to identify the peripheral device from which the peripheral device message originated. Subscriber A may use the data received as a result of the button press at a time convenient for subscriber A. Thus, the receipt of data from a peripheral device, such as data regarding a hardware event, is decoupled from the processing of the data from the one or more subscribers that are subscribed to receive the data.

Subscriber B in this example is subscribed to receive data from the GPS device. Subscriber B may be, for example, part of a program that compares GPS location data against the location of various landmarks or businesses and, when one or more such locations are determined to be near the received GPS data, update and display the names and distances to the locations to a user. In this example, subscriber C is also subscribed to receive GPS data. The GPS device is configured to receive signals from GPS satellites, to use the signals to calculate location, and to send GPS location data to the embedded processor periodically (e.g., once per second). The GPS data sent each second is larger than the data buffer unit can store at one time. When the GPS device sends data, the data begins filling up the data buffer unit. This causes the non-programmable logic of data buffer unit B to trigger an interrupt, is trapped by an interrupt controller that, in turn, alerts the VM, which then invokes an ISR.

In this example, the data that is received from the GPS device is taken as it comes in from the data buffer unit and stored in bridge buffer B. At this point in the example, bridge buffer B stores the bridge buffer message and the VM and processor return to the bytecode that was being executed before the interrupt was triggered. Once the bytecode is finished executing, the VM checks the bridge buffers for any data to which the subscribers are subscribed. In the case of the GPS device, subscribers B and C are specified as subscribers to data from the GPS device, and data has been received from the GPS device. Therefore, the VM creates a string out of the bridge buffer message created by the ISR. In one or more embodiments of the invention, subscriber B and subscriber C have been recorded as subscribers to receive the data in bridge buffer B when it arrives from the GPS device, which allows the VM to know to send the bridge buffer message to thread message queue B of subscriber B and thread message queue C of subscriber C. In such embodiments, the VM creates a peripheral device message that includes, at least, the string created from the bridge buffer message and places the peripheral device message in the thread message queues of subscribers B and C. In one optional embodiment of the invention, the VM uses an identifier/tag of bridge buffer (i.e., B) to create a two element tuple peripheral device message, where the first element is the identifier/tag (which allows subscriber B and subscriber C to know that the peripheral device message originated from the GPS device) and the second element is the string of the GPS data. This peripheral device message is then placed in thread message queue B of subscriber B as well as thread message queue C of subscriber C. Subscriber B and subscriber C may use the data received from the GPS device at a later time convenient to the subscribers and/or required by the intended functionality of the software thread that is the subscriber. In this example, subscriber B uses the data received from the GPS device each time it arrives to update the list of locations near the measured location. Subscriber C's use of the received GPS data is described below.

The timer of the embedded processor is the third peripheral device in this example. Subscriber C is a program that, among other tasks, plots the GPS location of the device on a map over time. The program is configured to create a plot point on the map corresponding to where the device was at 5 second intervals, which is slower than the rate at which the GPS device sends location data to the embedded processor. The timer of the embedded processor is used to alert subscriber C each time five seconds have passed. Thus, at each five second interval, data is sent from the timer to the data buffer unit, triggering an interrupt and the invoking of the ISR. The ISR uses the data from the timer to construct a bridge buffer message which is placed in bridge buffer C. The VM then returns to executing the bytecode it was executing when the interrupt triggered. When the VM completes execution of the bytecode, it checks the bridge buffers to determine if there is any data in the bridge buffers that subscribers have been specified to receive. In this example, subscriber C is specified to receive data from both the GPS device and the timer. The program of which subscriber C is a part is configured such that if a GPS data message is placed in thread message queue C but no timer data is placed in thread message queue C, then the GPS data message is discarded. If, however, the VM finishes executing the bytecode and finds GPS data in bridge buffer B and timer data in bridge buffer C, then both bridge buffer messages are placed in thread message queue C. Subscriber C, when convenient, notes that both the 5 second interval timer message and the GPS data message are in its thread message queue as peripheral device messages at the same time, and therefore creates a plot point on a map noting the location of the GPS device. Over time this develops into a map of the path that the GPS device has traveled.

One of ordinary skill in the art and having the benefit of this disclosure will appreciate that the VM, upon completion of a bytecode, may be configured to service all the bridge buffers that include data that any subscriber is specified to receive before moving on to execute the next bytecode. Alternately, the VM may be configured to service only a select portion of the bridge buffers at the completion of any given bytecode, or only a certain number per finished bytecode, or only bridge buffers designated as a certain priority level.

One of ordinary skill in the art and having the benefit of this disclosure will recognize that the method in the invention of receiving input from or sending output to peripheral devices of an embedded processor may include advantages when compared to existing methods. For example, an existing method includes periodic polling of the peripheral devices to determine if the peripheral devices have data to send. If the peripheral devices are polled too quickly, then processor cycles of the embedded processor are wasted. If the peripheral devices are polled too slowly, then the embedded processor bears the risk of missing data from the peripheral devices. One or more embodiments of the invention may overcome the limitations of the polling method. Specifically, one or more embodiments of the invention only take action when data is actually received from a peripheral device, and all data received from peripheral devices may be appropriately handled without the risk of missing any data.

Another example of an existing method other than polling for servicing data received from peripheral devices is a traditional interrupt driven model in which the data from the peripheral devices triggers an interrupt, at which point the embedded processor must stop execution of whatever instructions were being executed, service the interrupt, and then allows the program that requires the data to take action relating to the data received from the peripheral device before the processor returns to whatever instruction was being executed before the interrupt occurred. In such a method, the interrupt thread and the processor thread may have to modify a shared data construct, which may lead to problems if the shared modification is not appropriately programmed. One or more embodiments of the invention overcome the limitations of the interrupt method. One or more embodiments of the invention only cease execution of instructions long enough to service the interrupt by obtaining the data from the peripheral device and storing the data in a bridge buffer. Thus the embedded processor may return to finish the bytecode or AST node that was being executed, and complete it before the bridge buffer message is taken from the bridge buffer and, along with the identifier, placed as a peripheral device message in the thread message queue of a subscriber. Additionally, the data received from the peripheral device and ultimately placed in the tread message queue of a subscriber need not be dealt with until such time as is convenient for the subscriber. Furthermore, no part of the invention includes any shared data construct that is modified by more than one entity, as the peripheral device messages may be immutable objects.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for communicating data between peripheral devices and an embedded processor, the method comprising:
receiving, at a first data buffer unit of the embedded processor, a first data from a first peripheral device;
copying the first data from the first data buffer unit into a first bridge buffer of the embedded processor as a first bridge buffer message;
creating, after copying the first data as the first bridge buffer message, a first peripheral device message comprising the first bridge buffer message; and
sending the first peripheral device message to a first thread message queue of a first subscriber.

2. The method of claim 1, wherein copying the first data from the first data buffer unit into the first bridge buffer comprises:
triggering, by a first non-programmable logic of the first data buffer unit and after receiving the first data from the first peripheral device, a first interrupt;
trapping the first interrupt with an interrupt controller, wherein trapping the first interrupt comprises alerting the embedded processor that the first interrupt occurred;
invoking, by the embedded processor and after halting execution of a program executing on the embedded processor, an interrupt service routine; and
resuming execution of the program after storing, by the interrupt service routine, the first data in the first bridge buffer as the first bridge buffer message.

3. The method of claim 2, further comprising:
creating a second bridge buffer for the first peripheral device;
generating, by the first subscriber, subscriber data;
triggering, after generating the subscriber data, a second interrupt;
trapping the second interrupt with the interrupt controller, wherein trapping the second interrupt comprises alerting the embedded processor that the second interrupt occurred;
storing the subscriber data in the second bridge buffer as a second bridge buffer message;
resuming execution of the program; and
upon completion of a first portion of the program, and after placing the subscriber data in the second bridge buffer:
sending the subscriber data to a second data buffer unit of the first peripheral device; and
sending the subscriber data from the second data buffer unit to the first peripheral device.

4. The method of claim 2, further comprising:
receiving a second data from a second peripheral device;
triggering, by a second non-programmable logic of a second data buffer unit and after receiving the second data from the second peripheral device, a second interrupt;
trapping the second interrupt with the interrupt controller, wherein trapping the second interrupt comprises alerting the embedded processor that the second interrupt occurred;
invoking, by the embedded processor and after halting execution of a program executing on the embedded processor, a second interrupt service routine;
modifying, by the second interrupt service routine, a position of a buffer head relative to a buffer tail in a second bridge buffer in response to the receipt of the second data at the embedded processor;
resuming execution of the program; and
upon completion of a second portion of the program, and after modifying the position of the buffer head relative to the buffer tail in the second bridge buffer:
creating a second peripheral device message indicating that the position of the buffer head is modified;
sending the second peripheral device message to a second thread message queue of a second subscriber.

5. The method of claim 1, wherein creating the first peripheral device message comprises:
assigning the first bridge buffer message an identifier, wherein the identifier identifies the first peripheral device;
creating a two-element data object as the first peripheral device message, wherein the two-element data object comprises the first bridge buffer message and the identifier, and wherein the identifier is used by the first subscriber to identify the first peripheral device from which the first data is received at the embedded processor;

6. The method of claim 1, wherein the first thread message queue comprises a plurality of messages and wherein the plurality of messages comprises the first peripheral device message and at least one software message from a second subscriber.

7. The method of claim 3, wherein the first subscriber is executing in a virtual machine (VM), wherein the VM is executing on the embedded processor, and wherein completion of the first portion of the program comprises completing execution of one selected from a group consisting of a bytecode and an abstract syntax tree node.

8. The method of claim 1, wherein the first peripheral device message is an immutable object.

9. An embedded processor operatively connected to a peripheral device, comprising:
a processor;
memory;
a data buffer unit configured to store data received from the peripheral device;
a bridge buffer operatively connected to the data buffer unit and to a thread message queue of a subscriber;

the subscriber executing on the embedded processor, wherein the subscriber is operatively connected to the thread message queue;

wherein the embedded processor is configured to:
receive, at the data buffer unit of the embedded processor, the data from the peripheral device;
copy the data from the data buffer unit into the bridge buffer of the embedded processor as a bridge buffer message;
create, after copying the data as the bridge buffer message, a peripheral device message comprising the bridge buffer message; and
send the peripheral device message to the thread message queue of the subscriber.

10. The embedded processor of claim 9, wherein the embedded processor further comprises an interrupt controller, wherein the data buffer unit comprises non- programmable logic, and wherein the embedded processor is further configured to:
trigger, by the non-programmable logic of the data buffer unit and after receiving the data from the peripheral device, an interrupt;
trap the interrupt with the interrupt controller, wherein trapping the interrupt comprises alerting the embedded processor that the interrupt occurred;
invoke, by the embedded processor and after halting execution of a program executing on the embedded processor, an interrupt service routine; and
resume execution of the program after storing, by the interrupt service routine, the first data in the bridge buffer as the bridge buffer message.

11. The embedded processor of claim 9, wherein the peripheral device is one selected from a group consisting of a button, a switch, a global positioning system (GPS), a range finder, light emitting diodes, a relay, a display, a keypad, a converter, a solenoid, a piezoelectric device, a thermometer, a radio device, a barometer, a humidity sensor, a light sensor, a gyroscope, a video/image capturing device, a button, a motor, a shaft encoder, a servo, an electronic engine control unit, an ignition controller and a timer.

12. The embedded processor of claim 9, wherein the peripheral device is connected to the embedded processor using one selected from a group consisting of a universal asynchronous receiver/transmitter (UART) connection, a universal serial bus (USB) connection, a general purpose input/output (GPIO) connection, a serial peripheral interface (SPI) bus, an inter-integrated circuit (I²C), a controller area network (CAN) interface, a FlexRay interface, a low pin count (LPC) interface, and a serial port.

13. The embedded processor of claim 9, wherein the peripheral device is an integrated component of the embedded processor.

14. The embedded processor of claim 9, wherein the bridge buffer is a ring buffer comprising a buffer head pointer, a buffer tail pointer and the data from the peripheral device.

15. A non-transitory computer readable medium comprising instructions, which when executed by a processor, perform a method for communicating data between peripheral devices and an embedded processor, the method comprising:
receiving, at a first data buffer unit of the embedded processor, a first data from a first peripheral device;
copying the first data from the first data buffer unit into a first bridge buffer of the embedded processor as a first bridge buffer message;
creating, after copying the first data as the first bridge buffer message, a first peripheral device message comprising the first bridge buffer message; and
sending the first peripheral device message to a first thread message queue of a first subscriber.

16. The non-transitory computer readable medium of claim 15, further comprising instructions for:
triggering, by a first non-programmable logic of the first data buffer unit and after receiving the first data from the first peripheral device, a first interrupt;
trapping the first interrupt with an interrupt controller, wherein trapping the first interrupt comprises alerting the embedded processor that the first interrupt occurred;
invoking, by the embedded processor and after halting execution of a program executing on the embedded processor, an interrupt service routine; and
resuming execution of the program after storing, by the interrupt service routine, the first data in the first bridge buffer as the first bridge buffer message.

17. The non-transitory computer readable medium of claim 16, further comprising instructions for:
creating a second bridge buffer for the first peripheral device;
generating, by the first subscriber, subscriber data;
triggering, after generating the subscriber data, a second interrupt;
trapping the second interrupt with the interrupt controller, wherein trapping the second interrupt comprises alerting the embedded processor that the second interrupt occurred;
storing the subscriber data in the second bridge buffer as a second bridge buffer message;
resuming execution of the program; and
upon completion of a first portion of the program, and after placing the subscriber data in the second bridge buffer:
sending the subscriber data to a second data buffer unit of the first peripheral device; and
sending the subscriber data from the second data buffer unit to the first peripheral device.

18. The non-transitory computer readable medium of claim 16, further comprising:
receiving a second data from a second peripheral device;
triggering, by a second non-programmable logic of a second data buffer unit and after receiving the second data from the second peripheral device, a second interrupt;
trapping the second interrupt with the interrupt controller, wherein trapping the second interrupt comprises alerting the embedded processor that the second interrupt occurred;
invoking, by the embedded processor and after halting execution of a program executing on the embedded processor, a second interrupt service routine;
modifying, by the second interrupt service routine, a position of a buffer head relative to a buffer tail in a second bridge buffer in response to the receipt of the second data at the embedded processor;
resuming execution of the program; and
upon completion of a second portion of the program, and after modifying the position of the buffer head relative to the buffer tail in the second bridge buffer:
creating a second peripheral device message indicating that the position of the buffer head is modified;
sending the second peripheral device message to a second thread message queue of a second subscriber.

19. The non-transitory computer readable medium of claim 15, further comprising instructions for:
assigning the first bridge buffer message an identifier, wherein the identifier identifies the first peripheral device;

creating a two-element data object as the first peripheral device message, wherein the two-element data object comprises the first bridge buffer message and the identifier, and wherein the identifier is used by the first subscriber to identify the first peripheral device from which the first data is received at the embedded processor.

20. The non-transitory computer readable medium of claim 15, wherein the first thread message queue comprises a plurality of messages and wherein the plurality of messages comprises the first peripheral device message and at least one software message from a second subscriber.

21. The non-transitory computer readable medium of claim 17, wherein the first subscriber is executing in a virtual machine (VM), wherein the VM is executing on the embedded processor, and wherein completion of the first portion of the program comprises completing execution of one selected from a group consisting of a bytecode and an abstract syntax tree node.

22. The non-transitory computer readable medium of claim 15, wherein the first peripheral device message is an immutable object.

* * * * *